United States Patent [19]
Sugawara

[11] Patent Number: 5,701,475
[45] Date of Patent: Dec. 23, 1997

[54] EYEPIECE LENS

[75] Inventor: Saburo Sugawara, Kanagawa-ken, Japan

[73] Assignee: Canon Kabushiki Kaisha, Tokyo, Japan

[21] Appl. No.: 513,393

[22] Filed: Aug. 10, 1995

[30] Foreign Application Priority Data

Aug. 31, 1994 [JP] Japan .................. 6-206791

[51] Int. Cl.⁶ .................. G02B 25/00; G02B 3/02; G02B 9/12
[52] U.S. Cl. .................. 359/644; 359/645; 359/716; 359/792
[58] Field of Search .................. 359/643, 644, 359/645, 716, 661, 792

[56] References Cited

U.S. PATENT DOCUMENTS

| | | | |
|---|---|---|---|
| 1,478,704 | 12/1923 | Erfle | 359/645 |
| 1,968,222 | 7/1934 | Richter | 359/716 |
| 2,206,195 | 6/1940 | König | 359/643 |
| 2,394,635 | 2/1946 | Reiss | 359/645 |
| 2,423,676 | 7/1947 | Altman | 359/645 |
| 2,549,158 | 4/1951 | Bertele | 359/644 |
| 3,384,434 | 5/1968 | Scidmore et al. | 359/644 |
| 3,390,935 | 7/1968 | Scidmore | 359/644 |
| 3,623,791 | 11/1971 | Uetake | 359/644 |
| 3,768,890 | 10/1973 | Osawa et al. | 359/644 |
| 4,268,128 | 5/1981 | Uetake et al. | 359/644 |
| 4,497,546 | 2/1985 | Kobayashi | 359/644 |
| 4,525,035 | 6/1985 | Nagler | 359/644 |
| 5,134,524 | 7/1992 | Hamano et al. | 359/687 |
| 5,162,945 | 11/1992 | Matsuo et al. | 359/644 |
| 5,202,795 | 4/1993 | Kashima | 359/645 |
| 5,341,243 | 8/1994 | Okuyama et al. | 359/687 |

*Primary Examiner*—Georgia Y. Epps
*Assistant Examiner*—Evelyn A. Lester
*Attorney, Agent, or Firm*—Fitzpatrick, Cella, Harper & Scinto

[57] ABSTRACT

An eyepiece lens comprising, from front to rear, a first lens unit of positive refractive power having a negative lens and a positive lens, a second lens unit of positive refractive power and a third lens unit of positive refractive power, wherein at least one of the lens surfaces in the first lens unit to the third lens unit is made aspherical, and wherein the apparent field of view covers an angle of about 50 degrees, the eye relief is elongated, and the field curvature is corrected well.

21 Claims, 4 Drawing Sheets

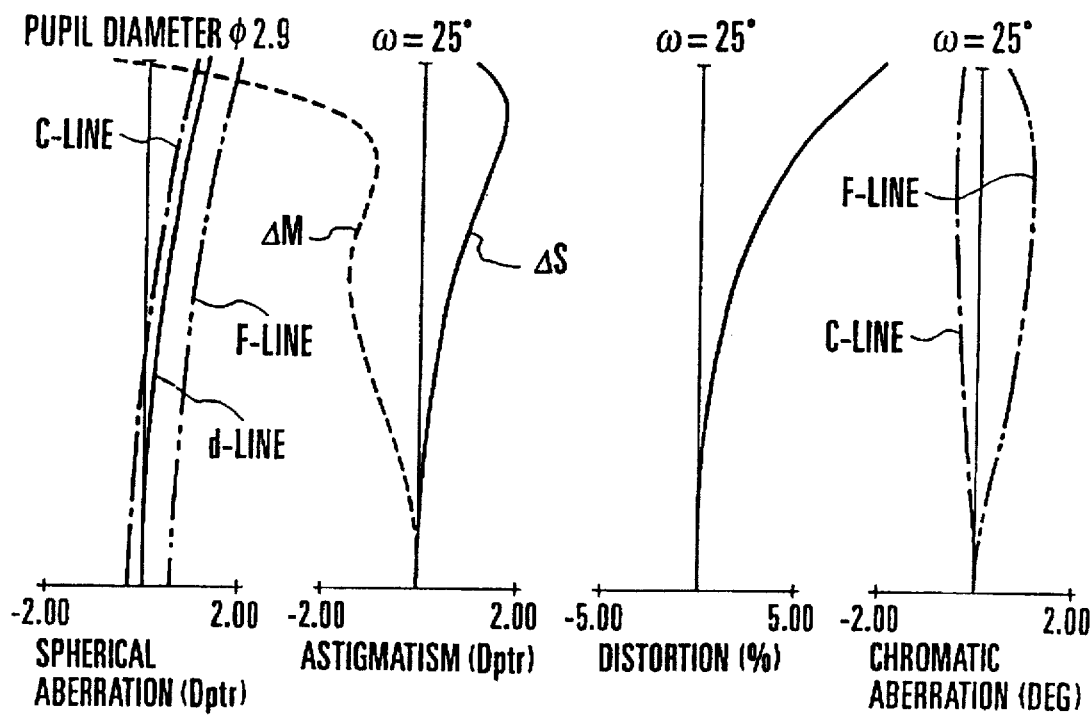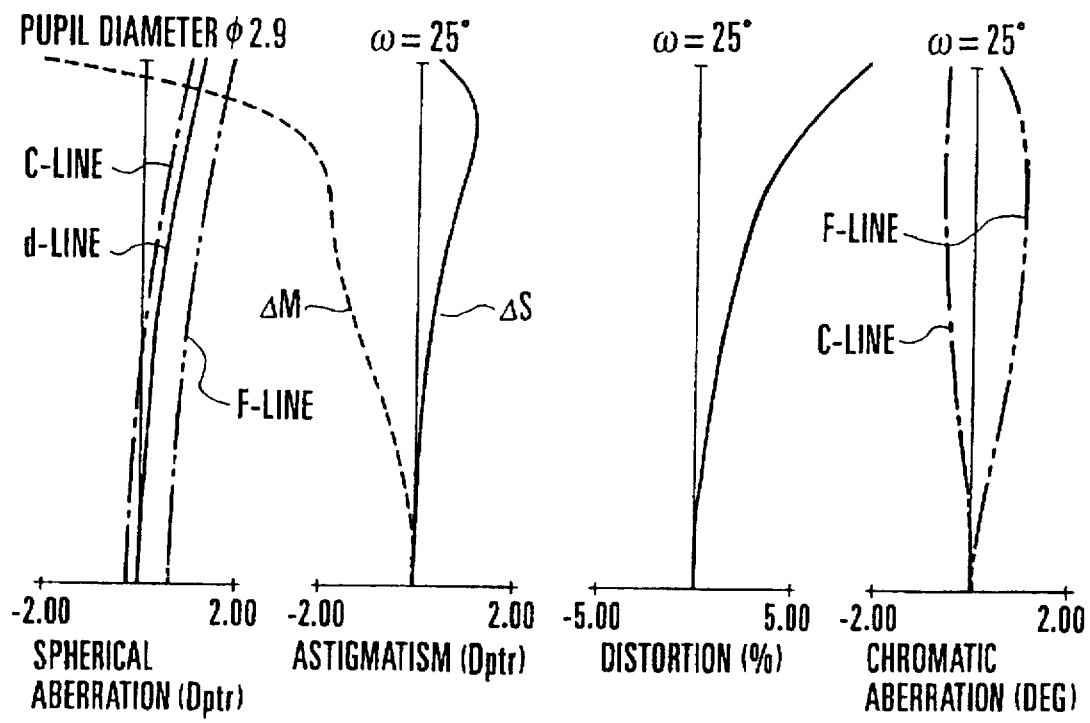

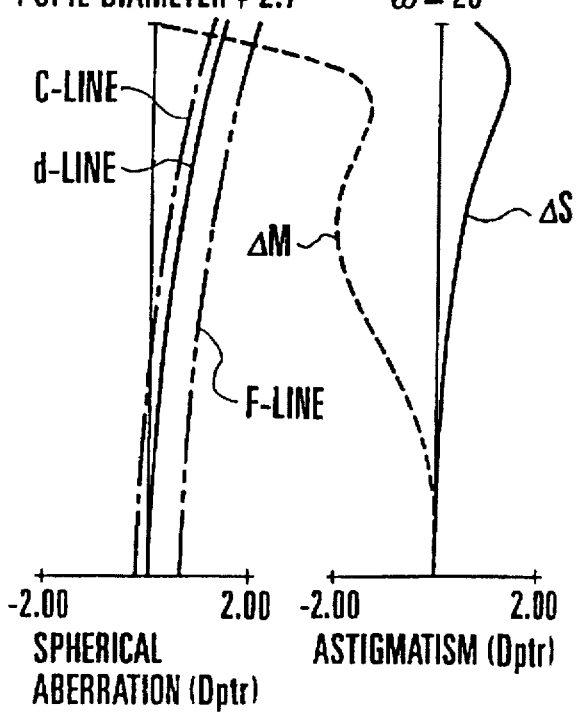
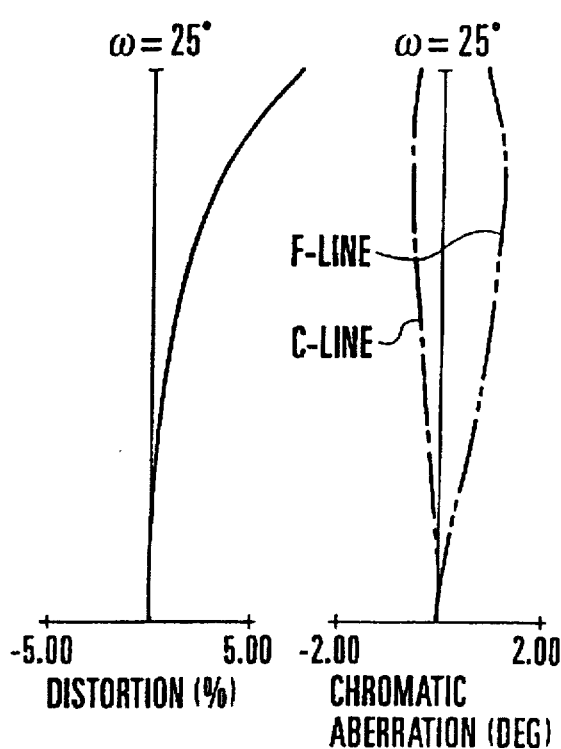
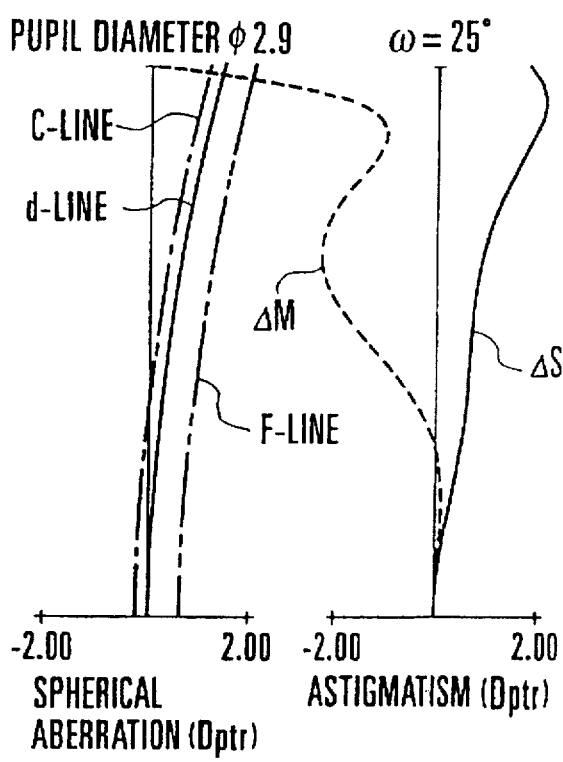
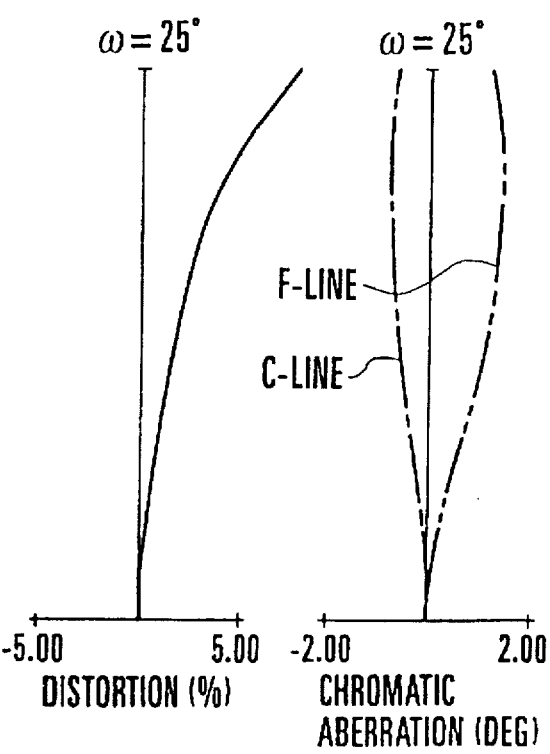

EYEPIECE LENS

BACKGROUND OF THE INVENTION

1. Field of the Invention

This invention relates to eyepiece lenses suited to be used in telescopes, binoculars, microscopes or like optical apparatus.

2. Description of the Related Art

For the eye relief to get long and for the apparent field of view to be widened to an angle of about 50 degrees, it has been known to construct the eyepiece lens with, from front to rear, a first lens unit having a cemented lens of a negative lens and a positive lens cemented together, a second lens unit of positive refractive power and a third lens unit of positive refractive power. However, such a construction and arrangement have a drawback that the field curvature of sagittal direction is liable to increase largely.

SUMMARY OF THE INVENTION

An object of the invention is to provide an eyepiece lens corrected for field curvature.

An eyepiece lens according to the invention comprises, from front to rear, a first lens unit of positive refractive power having a negative lens and a positive lens, a second lens unit of positive refractive power and a third lens unit of positive refractive power, wherein at least one of lens surfaces is made to be an aspheric surface.

Further, it is desirable that the first lens unit is a cemented lens formed by cementing together the negative lens and the positive lens.

Further, it is desirable that the negative lens and the positive lens of the cemented lens in the first lens unit are arranged in this order from the object side.

Further, it is desirable that the aspheric surface described above is other than a cementing surface in the first lens unit.

Further, it is desirable that the aspheric surface is formed to such shape that the positive refractive power gets progressively weaker, or the negative refractive power gets progressively stronger, toward the margin.

Further, it is desirable that at least one of the lenses included in the eyepiece lens is made from an optical material of resin system.

On the other hand, it is desirable to satisfy the following conditions:

$$0.5 < -R/f < 1.3 \quad (1)$$

where R is a radius of curvature of a lens surface on the observer side of the first lens unit and f is the focal length of the entire system. Further, it is more desirable for improvements of the result to narrow the range by altering either the upper limit of the inequalities (1) to 1.2, or the lower limit to 0.6, or the upper and lower limits to 1.2 and 0.6, respectively.

$$vp - vn > 25 \quad (2)$$

where $vp$ is the mean value of the Abbe numbers of the positive lenses in the eyepiece lens, and $vn$ is the mean value of the Abbe numbers of the negative lenses in the eyepiece lens, wherein, if the negative lens is only one in number, $vn$ represents the Abbe number of that negative lens by itself.

Further, it is desirable that the first lens unit comprises one cemented lens whose lens surface on the observer side has a strong refractive power, and the second lens unit and the third lens unit each comprise one positive lens whose lens surface on the object side has a strong refractive power.

The eyepiece lens of the invention is most suited to binoculars, telescopes, microscopes or like optical apparatus.

BRIEF DESCRIPTION OF THE DRAWINGS

FIGS. 5A-5D show graphic representations of the aberrations of the numerical example 1.

FIGS. 6A-6D show graphic representations of the aberrations of the numerical example 2.

FIGS. 7A-7D show graphic representations of the aberrations of the numerical example 3.

FIGS. 8A-8D show graphic representations of the aberrations of the numerical example 4.

DETAILED DESCRIPTION OF THE PREFERRED EMBODIMENTS

Figure 1:
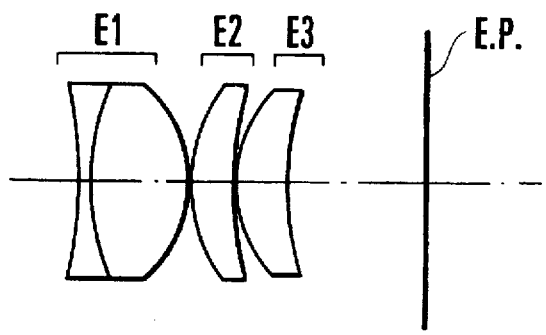
FIG. 1 is a lens block diagram of a numerical example 1 of the invention.
Figure 2:
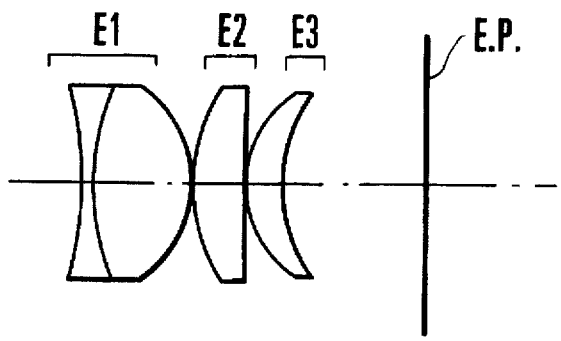
FIG. 2 is a lens block diagram of a numerical example 2 of the invention.
Figure 3:
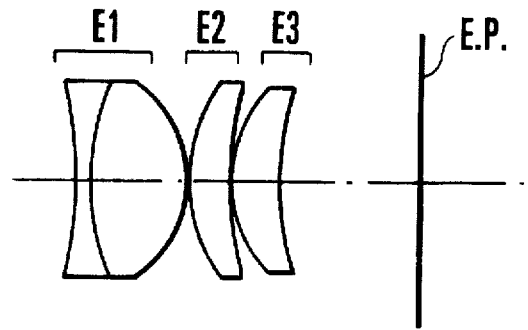
FIG. 3 is a lens block diagram of a numerical example 3 of the invention.
Figure 4:
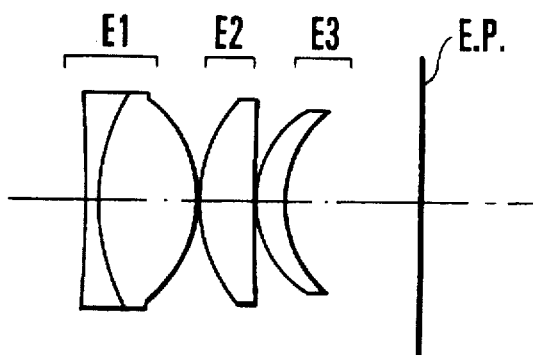
FIG. 4 is a lens block diagram of a numerical example 4 of the invention.

The invention is next described in connection with embodiments of eyepiece lenses thereof by reference to the drawings. FIG. 1 to FIG. 4 show the longitudinal sections of the eyepiece lenses according to numerical examples 1 to 4 to be described later.

In the longitudinal section views, it is assumed that on the left front side there are an object and an objective lens. Reference character E1 denotes a positive first lens unit comprising a cemented lens formed by cementing together a bi-concave lens and a bi-convex lens. The bi-convex lens has its lens surface on the observer side to be strong in refractive power as compared with the opposite surface. Reference character E2 denotes a second lens unit comprising a positive meniscus lens convex toward the object side. Reference character E3 denotes a third lens unit comprising a positive meniscus lens convex toward the object side. The lens surface on the object side of the second lens unit E2 is made to be an aspheric surface. E.P. stands for the eye point.

The reason why the negative lens is arranged on the frontmost position is to elongate the eye relief. Also, the reason why the aspheric surface is used in at least one of the lens surfaces is to weaken the refractive power in the marginal zone of the lens to well correct field curvature. The general-purpose eyepiece lens, because its exit pupil lies outside the lens system, does not permit the off-axial light beam to pass through it but the marginal zone of one side of the lens. As the overall refractive power of the eyepiece lens is positive, therefore, the eyepiece lens owing to the spherical aberration in itself is progressively too much strong in the refractive power toward the margin, causing the field curvature to be largely under-corrected. This can be improved remarkably by using the aspherical lens. Though, in the present embodiment, only the lens surface on the object side of the second lens unit E2 is aspherical, it may be considered that two or more lens surfaces are made aspherical.

The significance of the limits of the conditions (1) and (2) are explained below.

The inequalities of condition (1) give a range for the ratio of the radius of curvature of the lens surface on the observer side of the first lens unit to the focal length of the entire system. In a range beyond the lower limit of the condition (1), the eye relief gets short. In a range beyond the upper limit of the condition (1), astigmatism increases largely. So, these are not preferable.

The inequality of condition (2) gives a range for the mean value of the Abbe numbers of the positive lenses in the eyepiece lens and for the mean value of the Abbe numbers of the negative lenses in the same. In a range beyond the lower limit of the condition, lateral chromatic aberration and longitudinal chromatic aberration become under-corrected. So, this should be avoided.

To realize formation of the aspheric surface at a low cost, it is recommended to use an optical material of resin system. It is also to be noted that the aspheric surface may take any position except the cemented part of the first lens unit to produce a similar effect.

To reduce the astigmatism and coma, the lens surface on the observer side of the first lens unit is made strong in refractive power and the lens surfaces on the object side of the second lens unit and the third lens unit are made strong in refractive power.

Next, numerical examples 1 to 4 are shown, where:

ri: the radius of curvature of the i-th lens surface, when counted from the object side;

di: the i-th lens surface separation, when counted from the object side;

ni: the refractive index for the spectral d-line of the i-th lens, when counted from the object side; and vi: the Abbe number of the i-th lens, when counted from the object side.

The shape of the aspheric surface is expressed by the following equation:

$$X = \frac{(y^2/r)}{1 + \sqrt{1 - (1+K)(y/r)^2}} + A4y^4 + A6y^6 + A8y^8 + A10y^{10}$$

where r: the radius of the osculating sphere;

K: the conical constant; and

Ai: the aspheric coefficient of i degree;

The notation D+i stands for $\times 10^i$ and D-i for $\times 10^{-i}$.

NUMERICAL EXAMPLE 1 f=11.54396 Pupil Diameter: φ2.9 2ω=50° r 1=−30.340 d 1=1.00 n 1=1.84666 v 1=23.8 r 2=20.535 d 2=7.42 n 2=1.51633 v 2=64.2 r 3=−9.550 d 3=0.20 r 4=13.000 d 4=3.09 n 3=1.49171 v 3=57.4 r 5=27.234 d 5=0.20 r 6=10.214 d 6=3.95 n 4=1.51633 v 4=64.2 r 7=24.615 d 7=10.80 (Eye Relief)

| Aspheric Surface: the fourth lens surface | | |
|---|---|---|
| r | k | A4 |
| 1.30000D + 01 | 1.16100D − 01 | −7.55724D − 05 |
| A6 | A8 | A10 |
| −6.82558D − 07 | 1.78932D − 08 | −8.00000D − 11 |

NUMERICAL EXAMPLE 2 f=11.55922 Pupil Diameter: φ2.9 2ω=50° r 1=−32.275 d 1=1.00 n 1=1.84666 v 1=23.8 r 2=20.175 d 2=7.45 n 2=1.51633 v 2=64.2 r 3=−9.687 d 3=0.20 r 4=13.000 d 4=3.95 n 3=1.49171 v 3=57.4 r 5=108.424 d 5=0.20 r 6=8.648 d 6=2.84 n 4=1.49171 v 4=57.4 r 7=10.932 d 7=10.80 (Eye Relief)

| Aspheric Surface: the fourth lens surface | | |
|---|---|---|
| r | k | A4 |
| 1.30000D + 01 | 9.77996D − 02 | −5.93159D − 05 |
| A6 | A8 | A10 |
| −1.04497D − 06 | 2.48430D − 08 | −1.51438D − 10 |

NUMERICAL EXAMPLE 3 f=10.87152 Pupil Diameter: φ2.7 2ω=50° r 1=−21.050 d 1=1.00 n 1=1.84666 v 1=23.8 r 2=21.050 d 2=7.12 n 2=1.60311 v 2=60.7 r 3=−9.984 d 3=0.20 r 4=13.000 d 4=3.10 n 3=1.49171 v 3=57.4 r 5=27.234 d 5=0.20 r 6=10.740 d 6=3.84 n 4=1.60311 v 4=60.7 r 7=24.485 d 7=10.80 (Eye Relief)

| Aspheric Surface: the fourth lens surface | | |
|---|---|---|
| r | k | A4 |
| 1.30000D + 01 | 1.6100D − 01 | −7.55724D − 05 |
| A6 | A8 | A10 |
| −6.82558D − 07 | 1.78932D − 08 | −8.00000D − 11 |

NUMERICAL EXAMPLE 4 f=11.62245 Pupil Diameter: φ2.9 2ω=50° r 1=−191.447 d 1=1.00 n 1=1.84666 v 1=23.8 r 2=16.108 d 2=7.80 n 2=1.49171 v 2=57.4 r 3=−10.000 d 3=0.20 r 4=12.523 d 4=3.89 n 3=1.49171 v 3=57.4 r 5=111.384 d 5=0.20 r 6=8.218 d 6=2.26 n 4=1.51633 v 4=64.2 r 7=9.000 d 7=10.80 (Eye Relief)

| Aspheric Surface: the fourth lens surface | | |
|---|---|---|
| r | k | A4 |
| 1.25230D + 01 | −4.08768D − 02 | −1.70778D − 05 |
| A6 | A8 | A10 |
| −2.60303D − 06 | 5.99868D − 08 | −3.94897D − 10 |

| | Numerical Example | | | |
|---|---|---|---|---|
| Condition | 1 | 2 | 3 | 4 |
| −R/f | 0.827 | 0.838 | 0.918 | 0.860 |
| vp − vn | 38.13 | 35.87 | 35.8 | 35.87 |

As has been described above, according to the invention, an eyepiece lens of minimized field curvature is possible to realized.

Figure 9A:
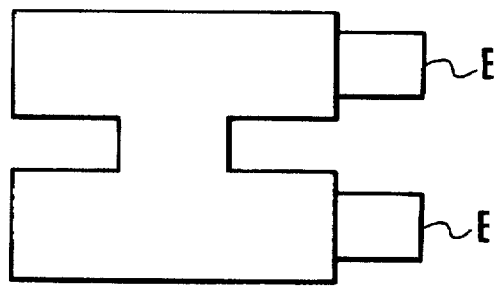
FIGS. 9(a), 9(b) and 9(c) show respectively different optical apparatus having the eyepiece lenses of the invention.
Figure 9B:
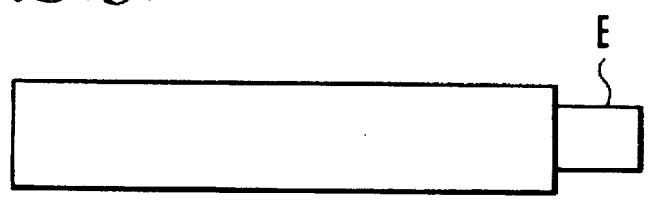
Figure 9C:
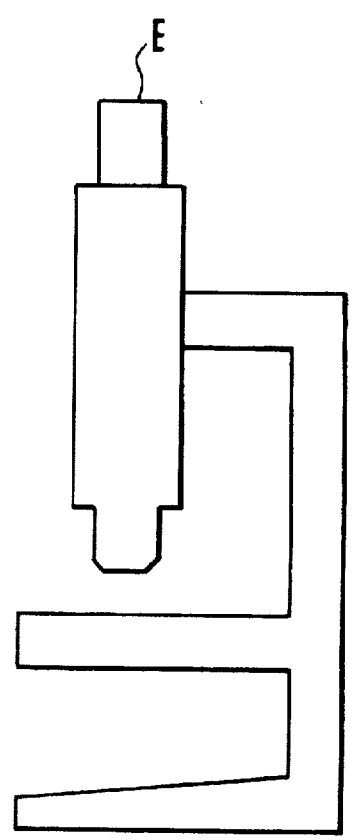

FIGS. 9(a), 9(b) and 9(c) are examples of application of the eyepiece lens E of the invention to optical apparatus. FIG. 9(a) shows a binocular, FIG. 9(b) a telescope, and FIG. 9(c) a microscope.

The eyepiece lens of the invention is most suited to be used in the optical apparatus of the type in which, for the eyepiece lens, the focal length is short and, therefore, the eye relief is liable to become short, such as the binocular, or the compact telescope.

What is claimed is:

1. An eyepiece lens comprising, from front to rear, a first lens unit of positive refractive power having a negative lens and a positive lens, a second lens unit of positive refractive power and a third lens unit of positive refractive power, wherein at least one of the lens surfaces in said first lens unit to said third lens unit is made to be an aspheric surface, and wherein said aspheric surface is formed to such shape that a positive refractive power gets progressively weaker toward the margin, or a negative refractive power gets progressively stronger toward the margin.

2. An eyepiece lens according to claim 1, wherein said first lens unit is a cemented lens formed by cementing together said negative lens and said positive lens.

3. An eyepiece lens according to claim 2, wherein said first lens unit is a cemented lens of said negative lens and said positive lens arranged in order from an object side and cemented together.

4. An eyepiece lens according to claim 3, wherein said aspheric surface is any one of the lens surfaces except a cementing surface of said cemented lens of said first lens unit.

5. An eyepiece lens according to claim 1, wherein at least one of the lenses included in said eyepiece lens is made from an optical material of resin system.

6. An eyepiece lens according to claim 1, satisfying the following condition:

$$0.5 < -R/f < 1.3$$

where R is a radius of curvature of a lens surface on an observer side of said first lens unit, and f is the focal length of the entire system.

7. An eyepiece lens according to claim 1, satisfying the following condition:

$$0.6 < -R/f < 1.2$$

where R is a radius of curvature of a lens surface on an observer side of said first lens unit, and f is the focal length of the entire system.

8. An eyepiece lens according to claim 1, satisfying the following condition:

$$\nu p - \nu n > 25$$

where $\nu p$ is a mean value of the Abbe numbers of positive lenses included in said eyepiece lens, and $\nu n$ is a mean value of the Abbe numbers of negative lenses included in said eyepiece lens.

9. An eyepiece lens according claim 1, wherein said first lens unit comprises one cemented lens whose lens surface on an observer side has a refractive power stronger than the other lens surface of said cemented lens, and said second lens unit and said third lens unit each comprise one positive lens whose lens surface on an object side has a refractive power stronger than the other surface of said positive lens.

10. An optical apparatus comprising an objective lens and an eyepiece lens, said eyepiece lens comprising, from front to rear, a first lens unit of positive refractive power having a negative lens and a positive lens, a second lens unit of positive refractive power and a third lens unit of positive refractive power, wherein at least one of the lens surfaces in said first lens unit to said third lens unit is made to be an aspheric surface, and wherein said aspheric surface is formed to such shape that a positive refractive power gets progressively weaker toward the margin, or a negative refractive power gets progressively stronger toward the margin.

11. An optical apparatus according to claim 10, wherein said first lens unit is a cemented lens formed by cementing together said negative lens and said positive lens.

12. An optical apparatus according to claim 11, wherein said first lens unit is a cemented lens of said negative lens and said positive lens arranged in order from an object side and cemented together.

13. An optical apparatus according to claim 12, wherein said aspheric surface is any one of the lens surfaces except a cementing surface of said cemented lens of said first lens unit.

14. An optical apparatus according to claim 10, wherein at least one of the lenses included in said eyepiece lens is made from an optical material of resin system.

15. An optical apparatus according to claim 10, satisfying the following condition:

$$0.5 < -R/f < 1.3$$

where R is a radius of curvature of a lens surface on an observer side of said first lens unit, and f is the focal length of the entire system.

16. An optical apparatus according to claim 10, satisfying the following condition:

$$0.6 < -R/f < 1.2$$

where R is a radius of curvature of a lens surface on an observer side of said first lens unit, and f is the focal length of the entire system.

17. An optical apparatus according to claim 10, satisfying the following condition:

$$\nu p - \nu n > 25$$

where $\nu p$ is a mean value of the Abbe numbers of positive lenses included in said eyepiece lens, and $\nu n$ is a mean value of the Abbe numbers of negative lenses included in said eyepiece lens.

18. An optical apparatus according to claim 10, wherein said first lens unit comprises one cemented lens whose lens surface on an observer side has a refractive power stronger than the other lens surface of said cemented lens, and said second lens unit and said third lens unit each comprise one positive lens whose lens surface on an object side has a refractive power stronger than the other surface of said positive lens.

19. An optical apparatus according to claim 10, wherein said optical apparatus is a binocular.

20. An optical apparatus according to claim 10, wherein said optical apparatus is a telescope.

21. An optical apparatus according to claim 10, wherein said optical apparatus is a microscope.

* * * * *